(12) United States Patent
Shibukawa et al.

(10) Patent No.: US 7,246,766 B2
(45) Date of Patent: Jul. 24, 2007

(54) TORQUE LIMITER

(75) Inventors: Kazuo Shibukawa, Osaka (JP);
Koichiro Hirabayashi, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 224 days.

(21) Appl. No.: 10/813,382

(22) Filed: Mar. 30, 2004

(65) Prior Publication Data

US 2004/0211855 A1    Oct. 28, 2004

(30) Foreign Application Priority Data

Mar. 31, 2003  (JP) .............................. 2003-094969

(51) Int. Cl.
*B65H 23/06* (2006.01)
(52) U.S. Cl. ................. 242/422.2; 242/545.1
(58) Field of Classification Search ............ 242/422.2, 242/340, 342, 349, 356, 545, 545.1; 360/96.1, 360/96.3; 464/29
See application file for complete search history.

(56) References Cited

U.S. PATENT DOCUMENTS 5,445,338 A * 8/1995 Nakase ................. 242/545
5,481,418 A * 1/1996 Maikuma et al. .......... 360/96.3
6,722,992 B2 * 4/2004 Hirabayashi et al. ......... 464/29
6,817,949 B2 * 11/2004 Hirabayashi et al. ......... 464/29
2002/0179393 A1 * 12/2002 Hirabayashi et al. ......... 464/29

FOREIGN PATENT DOCUMENTS

| JP | 62-14358    | * | 1/1987  |
| JP | 6-150451    | * | 5/1994  |
| JP | 6-223446    | * | 8/1994  |
| JP | 10-274252   | * | 10/1998 |
| JP | 2002-358701 | * | 12/2002 |
| JP | 2002-358702 | * | 12/2002 |

* cited by examiner

*Primary Examiner*—William A. Rivera
(74) *Attorney, Agent, or Firm*—Renner, Otto, Boisselle & Sklar, LLP

(57) ABSTRACT

A torque limiter includes a first rotatable body rotatable around a rotation shaft as a center of rotation; and a second rotatable body rotatable around the rotation shaft as a center of rotation. The first rotatable body includes one of a magnet and a hysteresis plate. The second rotatable body includes the other of the magnet and the hysteresis plate. The magnet and the hysteresis plate face each other. The first rotatable body and the second rotatable body are in contact with each other. No wall is provided between the rotation shaft and a contact area at which the first rotatable body and the second rotatable body are in contact with each other.

11 Claims, 5 Drawing Sheets

TORQUE LIMITER

This non-provisional application claims priority under 35 U.S.C., §119(a), on Patent Application No. 2003-094969 filed in Japan on Mar. 31, 2003, the entire contents of which are hereby incorporated by reference.

BACKGROUND OF THE INVENTION

1. Field of the Invention

The present invention relates to a torque limiter, and in particular to a reel stand used in recording and reproduction apparatuses such as, for example, video tape recorders and audio tape recorders, and acting as a torque limiter.

2. Description of the Related Art

A conventional reel stand acting as a torque limiter will be described.

FIG. 5 is a cross-sectional view of a conventional reel stand 500 acting as a torque limiter, which is described in, for example, Japanese Laid-Open Publication No. 11-273188.

The reel stand 500 includes an upper reel stand section 52 and a lower reel stand section 53. A magnetic tape 51 is wound around a reel 50 built in a cassette (not shown).

The upper reel stand section 52 on which the reel 50 is to be placed is rotatably outserted into a rotation shaft 1. A disc-shaped yoke plate 54 is formed of a ferromagnetic material such as, for example, rolled steel and is integrally formed with the upper reel stand section 52. The upper reel stand section 52 and the yoke plate 54 may be outsert-molded. A magnet 55 is adsorbed to the yoke plate 54 by a magnetic force generated by the magnet 55, and is rotated with the yoke plate 54. A magnetic flux (not shown) generated by the magnet 55 forms a magnetic loop which passes through the yoke plate 54.

The lower reel stand section 53 is rotatably outserted into the rotatable shaft 1, like the upper reel stand section 52. The lower reel stand section 53 is integrally formed with a disc-shaped hysteresis plate 56. The hysteresis plate 56 is formed of a material having a magnetic hysteresis loss. The lower reel stand section 53 and the hysteresis plate 56 may be outsert-molded. A gear section 12 engageable with an external gear (not shown) is provided around an outer circumference of the lower reel stand section 53. The lower reel stand section 53 is attracted toward the upper reel stand section 52 by the magnetic force generated by the magnet 55, and a washer 10 included in the lower reel stand section 53 is in contact with a contact portion 57 of the upper reel stand section 52 in a thrust direction. The washer 10 is often coated with oil (not shown) for the purpose of stabilizing a clutch torque generated in the reel stand 500. The rotation shaft 1 is also often coated with oil for the purpose of stabilizing the rotation of the entirety of the reel stand 500.

Hereinafter, an operation of the reel stand 500 will be described.

By the magnetic force generated by the magnet 55, a friction torque is generated between the washer 10 included in the lower reel stand section 53 and the contact portion 57. When the external gear (not shown) drives and rotates the lower reel stand section 53, the hysteresis plate 56 crosses the magnetic loop generated by the magnet 55, thus generating a magnetic hysteresis torque. The friction torque and the hysteresis torque act together as the clutch torque generated between the upper reel stand section 52 and the lower reel stand section 53. The reel stand 500, which is rotated by the external gear, rotates the reel 50 while supplying an appropriate tension to the magnetic tape 51 by the clutch torque.

With the conventional reel stand 500, it is difficult to stabilize the clutch torque. The clutch torque generated by the reel stand 500 needs to be constantly stable without being influenced by various external disturbances. More specifically, the clutch torque needs to have a stable value regardless of the rotation rate of the reel stand 500, environmental temperature and humidity of use, the length of time that the reel stand 500 has been used, and the like. The value of the friction torque, which is one component of the clutch torque, varies in accordance with the friction coefficient between the washer 10 and the contact portion 57 and the inner and outer diameters of the contact portion 57. The value of the friction coefficient is significantly influenced by the amount oil coating the washer 10 and how the washer 10 is coated with oil (e.g., whether the washer 10 is coated with oil uniformly or non-uniformly). The value of the friction coefficient varies in accordance with the rotation rate of the reel stand 500, environmental temperature and humidity of use, the length of time that the reel stand 500 has been used, and the like. One measure for stabilizing the clutch torque is to reduce the friction torque, which is difficult with the conventional reel stand 500. Since a wall 11 exists between the rotation shaft 1 and the contact portion 57, it is impossible to reduce the inner and outer diameters of the contact portion 57. Therefore, the friction torque cannot be reduced. There are the following additional problems. (1) In the case where the washer 10 is not sufficiently coated with oil, the washer 10 occasionally becomes out of oil while the reel stand 500 is being used. (2) The abrasion particles of the washer 10 generated by the long-time use enter between the washer 10 and the contact portion 57, generating abnormal abrasion of the washer 10.

SUMMARY OF THE INVENTION

A torque limiter according to the present invention includes a first rotatable body rotatable around a rotation shaft as a center of rotation; and a second rotatable body rotatable around the rotation shaft as a center of rotation. The first rotatable body includes one of a magnet and a hysteresis plate. The second rotatable body includes the other of the magnet and the hysteresis plate. The magnet and the hysteresis plate face each other. The first rotatable body and the second rotatable body are in contact with each other. No wall is provided between the rotation shaft and a contact area at which the first rotatable body and the second rotatable body are in contact with each other.

In one embodiment of the invention, the contact area is closer to the first rotatable body than a portion of the second rotatable body, the portion being inner to the contact area.

In one embodiment of the invention, the contact area is closer to the first rotatable body than an edge of an inner circumferential surface of the second rotatable body, the edge facing the first rotatable body.

In one embodiment of the invention, the contact area is in an identical plane to a portion of the second rotatable body, the portion being inner to the contact area.

In one embodiment of the invention, the contact area is in an identical plane to an edge of an inner circumferential surface of the second rotatable body, the edge facing the first rotatable body.

In one embodiment of the invention, the first rotatable body includes a first contact portion; and the second rotatable body includes a second contact portion which is contactable with the first contact portion at the contact area.

In one embodiment of the invention, each of the first contact portion, the second contact portion, and the rotation shaft is coated with a lubricant.

In one embodiment of the invention, the first contact portion, the second contact portion, and the rotation shaft are coated with an identical lubricant.

In one embodiment of the invention, one of the first contact portion and the second contact portion is a metal washer.

In one embodiment of the invention, the torque limiter further includes a yoke in contact with the magnet.

In one embodiment of the invention, the torque limiter is a reel stand.

Thus, the invention described herein makes possible the advantages of providing a torque limiter for providing a stable clutch torque and a reel stand acting as such a torque limiter.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to FIGS. 1 through 4.

EXAMPLE 1

Figure 1:
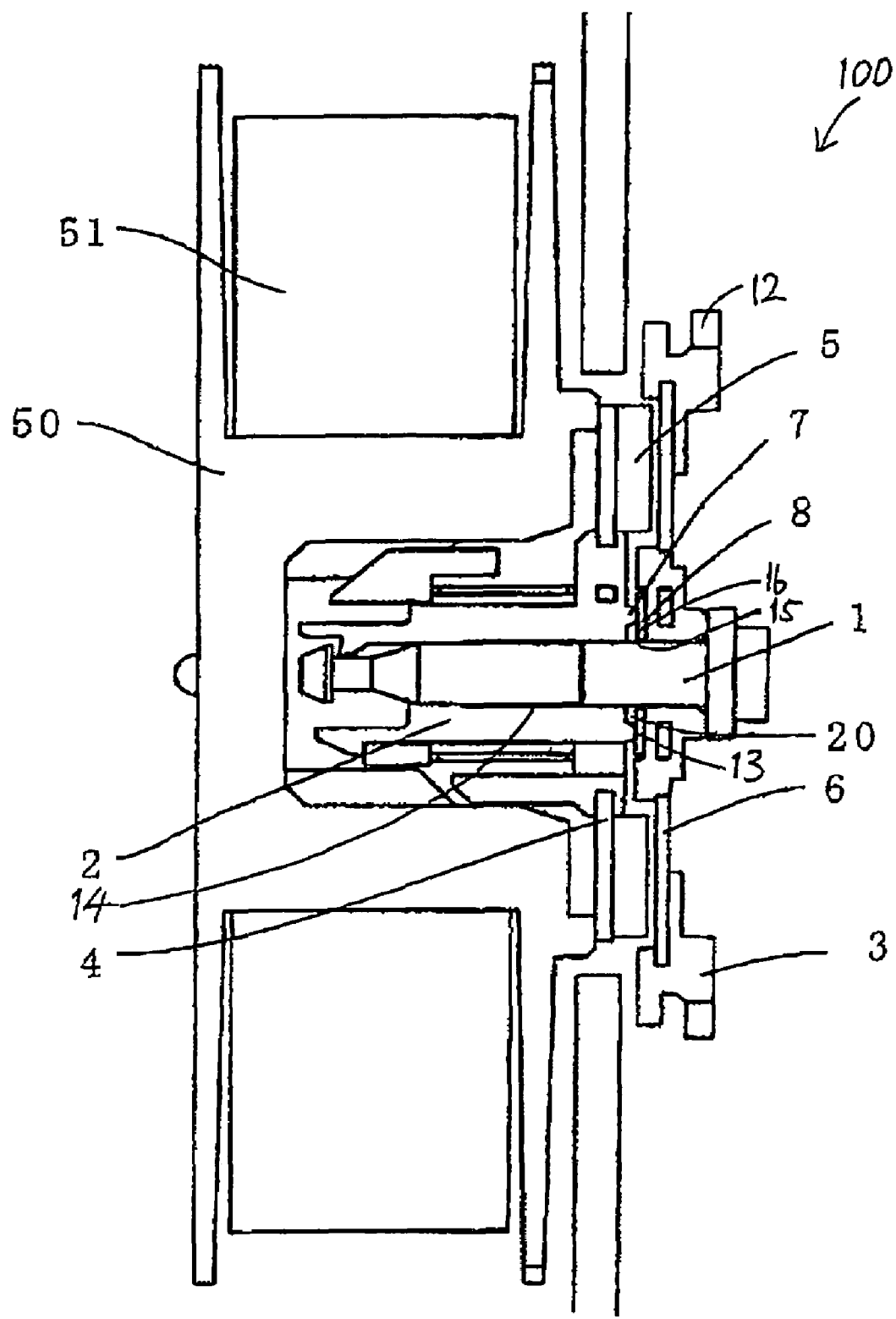
FIG. 1 is a cross-sectional view of a reel stand according to a first example of the present invention.

FIG. 1 is a cross-sectional view of a reel stand 100 according to a first example of the present invention.

The reel stand 100 acts as a torque limiter. The reel stand 100 is used for recording and reproduction apparatuses such as, for example, video tape recorders and audio tape recorders, for performing information recording to, and/or information reproduction from, a tape which has been pulled out from a cassette having a built-in reel by a tape guide member and has been wound around a rotatable head cylinder over a prescribed angle. The reel stand 100 can be referred to as a torque limiter acting as a reel stand.

The reel stand 100 includes an upper reel stand section 2 (first rotatable body) rotatable around a rotation shaft 1 as the center of rotation, and a lower reel stand section 3 (second rotatable body) rotatable around the rotation shaft 1 as the center of rotation. The upper reel stand section 2 includes a magnet 5, and the lower reel stand section 3 includes a hysteresis plate 6. The magnet 5 and the hysteresis plate 6 face each other with a gap therebetween.

Figure 2:
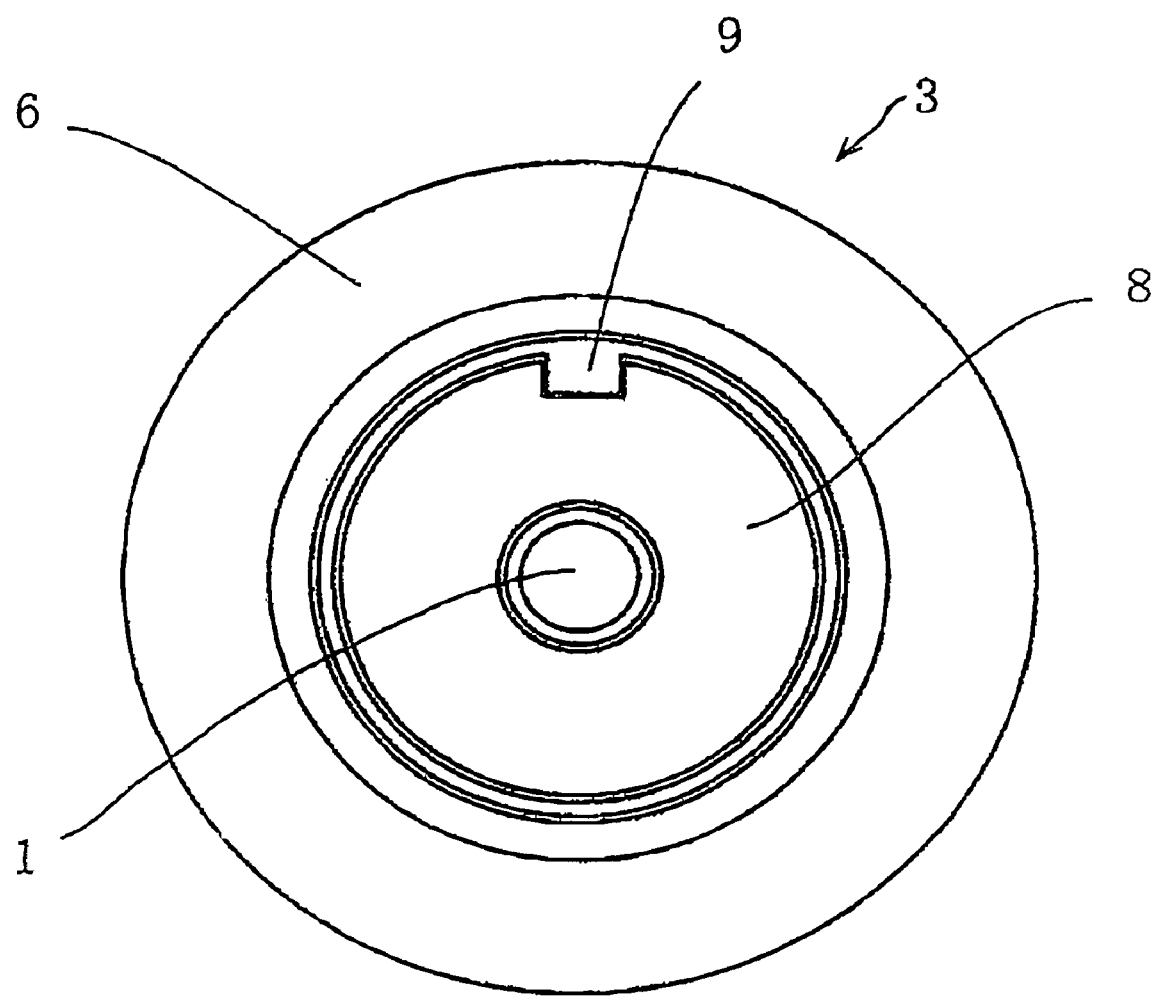
FIG. 2 is a partial plan view of a lower reel stand section of the reel stand shown in FIG. 1.

FIG. 2 is a partial plan view of the lower reel stand section 3. In FIGS. 1 and 2, identical elements previously discussed with respect to FIG. 5 bear identical reference numerals and the detailed descriptions thereof will be omitted.

A magnetic tape 51 is wound around a reel 50 built in a cassette (not shown).

The upper reel stand section 2 on which the reel 50 is to be placed is rotatably outserted into the rotation shaft 1. A disc-shaped yoke plate 4 is formed of a ferromagnetic material such as, for example, rolled steel and is integrally formed with the upper reel stand section 2. The upper reel stand section 2 and the yoke plate 4 may be outsert-molded. A magnet 5 is adsorbed to the yoke plate 4 by a magnetic force generated by the magnet 5, and is rotated with the yoke plate 4. A magnetic flux (not shown) generated by the magnet 5 forms a magnetic loop which passes through the yoke plate 4.

The lower reel stand section 3 is rotatably outserted into the rotatable shaft 1, like the upper reel stand section 2. The lower reel stand section 3 is integrally formed with the disc-shaped hysteresis plate 6. The hysteresis plate 6 is formed of a material having a large magnetic hysteresis loss. The lower reel stand section 3 and the hysteresis plate 6 may be outsert-molded. A gear section 12 engageable with an external gear (not shown) is provided around an outer circumference of the lower reel stand section 3. The lower reel stand section 3 is attracted toward the upper reel stand section 2 by the magnetic force generated by the magnet 5, and a metal washer 8 included in the lower reel stand section 3 contacts a contact portion 7 of the upper reel stand section 2 in a thrust direction. The metal washer 8 acts as a contact portion of the lower reel stand section 3.

The contact portion 7, the metal washer 8 and the rotation shaft 1 are coated with a lubricant 14 (for example, oil or grease) for the purpose of stabilizing a clutch torque generated in the reel stand 100 and also stabilizing the rotation of the entirety of the reel stand 100. In this example, the contact portion 7, the metal washer 8 and the rotation shaft 1 are coated with the same lubricant 14. The lubricant 14 is permeated into a contact area 13 at which the contact portion 7 and the metal washer 8 are in contact with each other.

Figure 5:
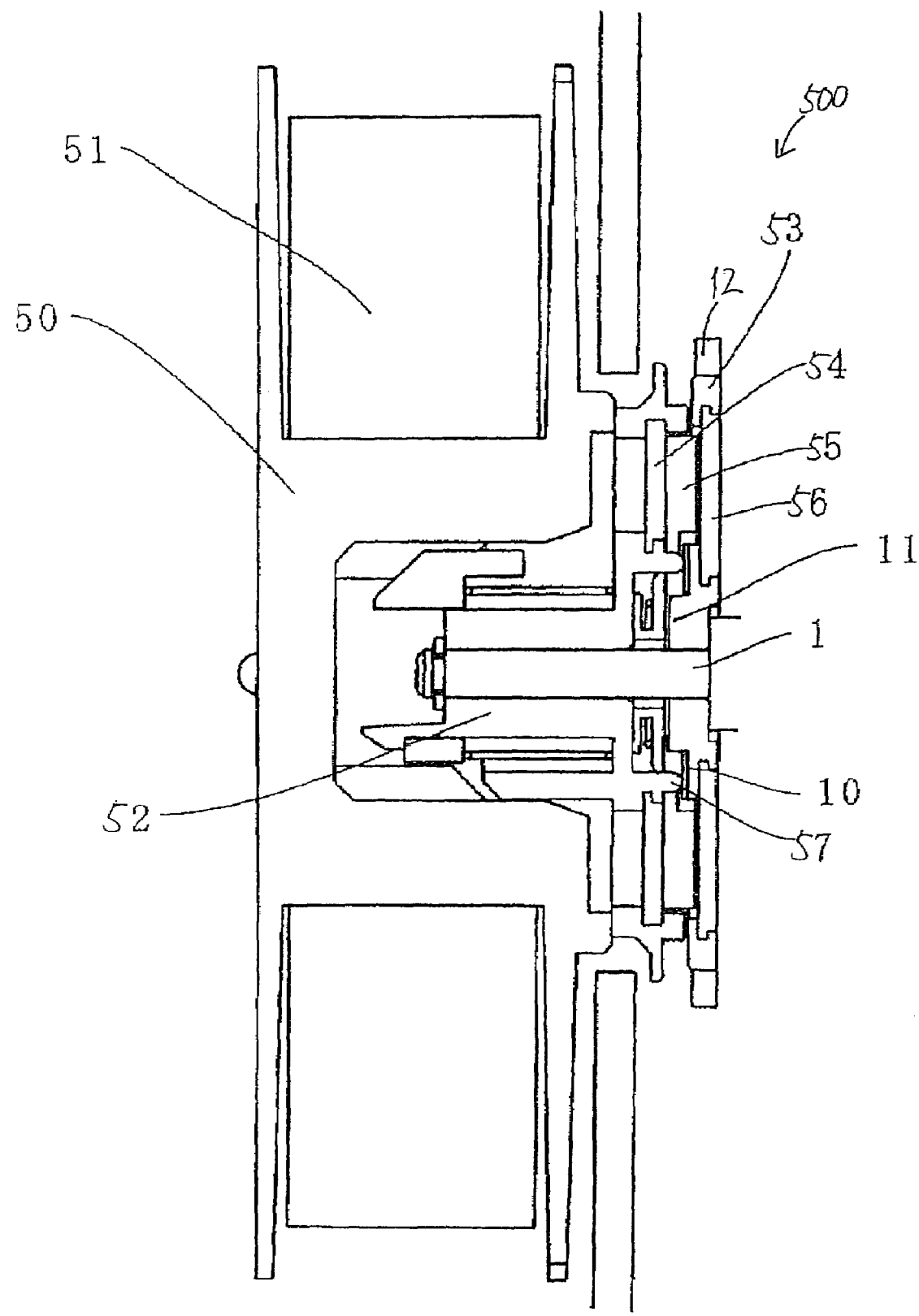
FIG. 5 is a cross-sectional view of a conventional reel stand.

The rotation shaft 1 and the contact portion 7 has a space 20 therebetween, not the wall 11 as shown in FIG. 5. Thus, an unobstructed oath exists in a plane perpendicular to the rotation shaft 1 between the rotation shaft 1 and the contact area as shown in FIG. 1. Owing to such a structure, the inner and outer diameters of the contact portion can be made smaller than those of the contact portion 57 shown in FIG. 5.

With reference to FIG. 2, the metal washer 8 is fixed to the lower reel stand section 3 via a stopper claw 9 formed in an outer circumference of the metal washer 8. The metal washer 8 rotates together with the lower reel stand section 3. The metal washer 8 is formed of a metal material such as, for example, stainless steel, cold-rolled steel, or nickel-plated cold-rolled steel. Owing to such a material, the metal washer 8 is improved in abrasion resistance and provides a stable friction coefficient with the contact portion 7.

Hereinafter, an operation of the reel stand 100 will be described.

By the magnetic force generated by the magnet 5, a friction torque is generated between the washer 8 included in the lower reel stand section 3 and the contact portion 7. When the external gear (not shown) drives and rotates the lower reel stand section 3, the hysteresis plate 6 crosses the magnetic loop generated by the magnet 5, thus generating a magnetic hysteresis torque. The friction torque and the hysteresis torque act together as the clutch torque generated between the upper reel stand section 2 and the lower reel stand section 3. The reel stand 100, which is rotated by the external gear, rotates the reel 50 while supplying an appropriate tension to the magnetic tape 51 by the clutch torque. The friction torque is more influenced by, for example, the length of time that the reel stand 100 has been used and the rotation rate of the reel stand 100, and thus is more easily changed, than the magnetic hysteresis torque. Therefore, the value of the clutch torque is more easily stabilized when the friction torque is lower.

In this example, the wall 11 as shown in FIG. 5 does not exist between the rotation shaft 1 and the contact area 13 of the contact portion 7 and the metal washer 8. This allows the diameter of the contact portion 7 to be reduced as compared to that of the contact portion 57 shown in FIG. 5. As a result, the friction torque generated between the contact portion 7 and the metal washer 8 can be lowered. This stabilizes the clutch torque.

In this example, the rotation shaft 1 and the contact area 13 do not have a wall therebetween, and the contact area 13 is in the same plane as a portion 16 of the lower reel stand section 3 which is inner to the contact area 13. The contact area 13 is in the same plane as an upper edge 15 of the inner circumferential surface of the lower reel stand section 3. Accordingly, when the contact portion 7 becomes short of the lubricant 14, the lubricant 14 on the rotation shaft 1 is supplied to the contact portion 7. Thus, the contact portion 7 is protected against from becoming out of lubricant. Since the wall is not present, the lubricant 14 is supplied from the rotation shaft 1 to the contact portion 7 smoothly. Since the elimination of the wall allows the lubricant 14 to be accumulated in the space 20, the contact portion 7 is protected against becoming out of lubricant. Foreign substances, such as abrasion particles, generated from the contact area 13 are discharged to the space 20 via the lubricant 14. Therefore, the contact portion 7 and the metal washer 8 are protected against abnormal abrasion. This stabilizes the clutch torque.

The contact area 13 may be closer to the upper reel stand section 2 than an upper surface of the portion 16. The contact area 13 may be closer to the upper reel stand section 2 than the upper edge 15. In these cases, the same effect as described above is provided owing to the elimination of the wall.

In the case where the inner diameter of the contact portion 7 is reduced such that the inner circumferential surface of the contact portion 7 contacts the rotation shaft 1, the friction torque can be further reduced.

EXAMPLE 2

Figure 3:
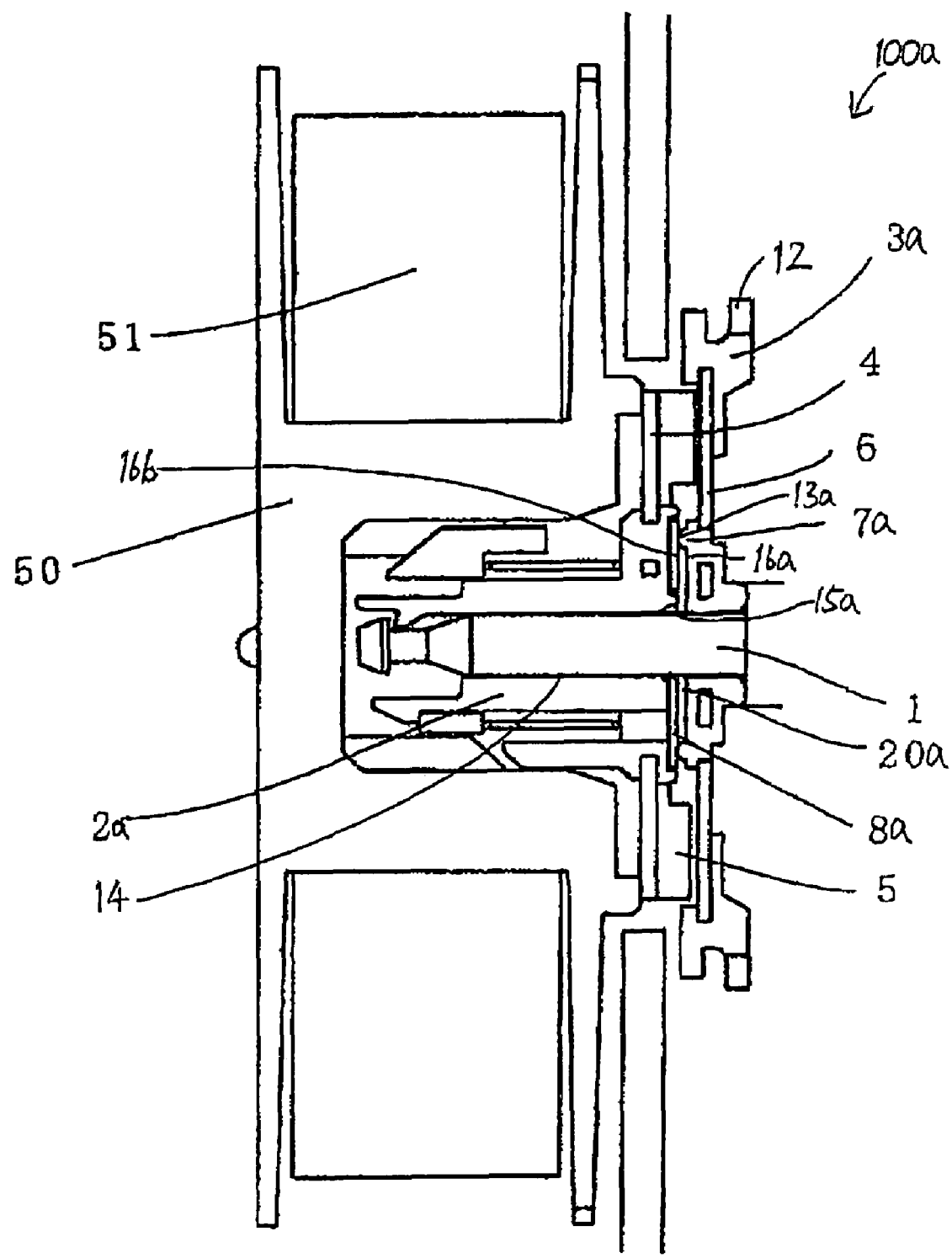
FIG. 3 is a cross-sectional view of a reel stand according to a second example of the present invention.
Figure 4:
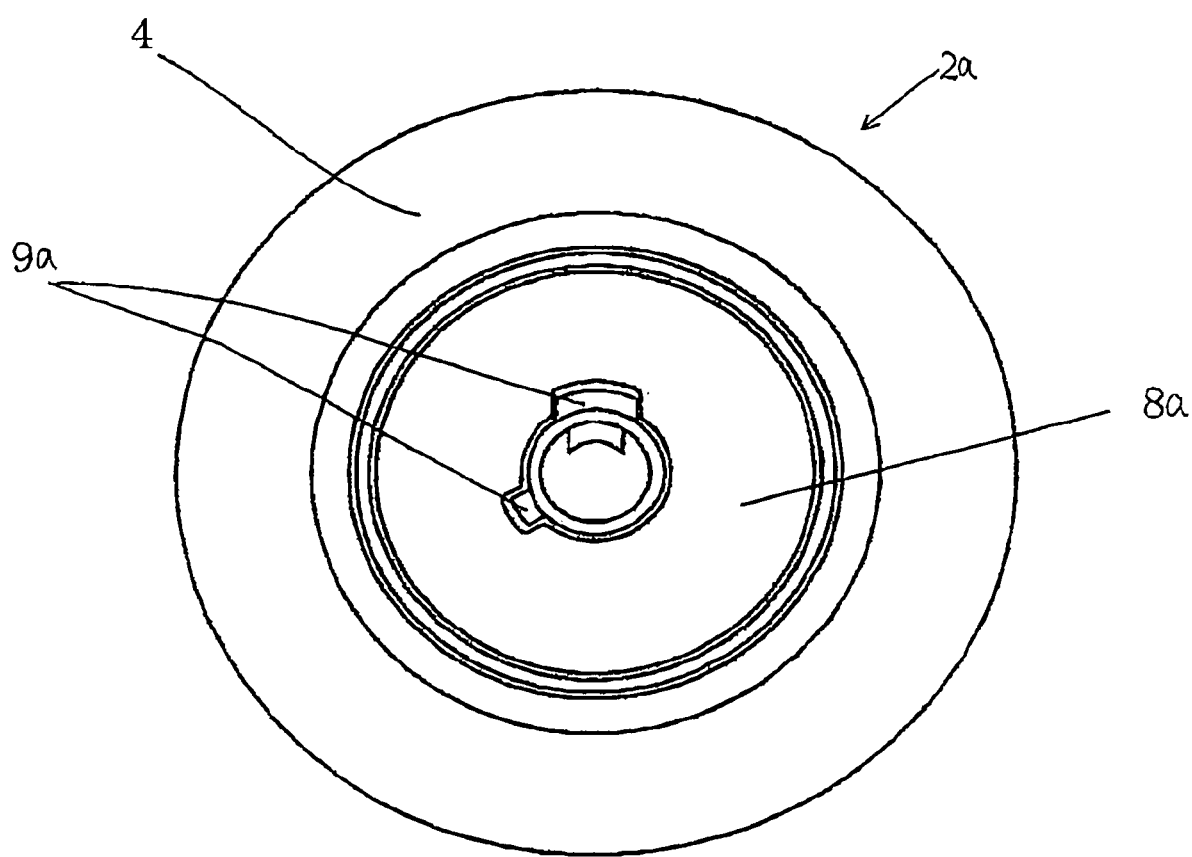
FIG. 4 is a partial bottom view of an upper reel stand section of the reel stand shown in FIG. 3.

FIG. 3 is a cross-sectional view of a reel stand 100a according to a second example of the present invention. In FIGS. 3 and 4 (referred to below), identical elements previously discussed with respect to FIGS. 1 and 2 bear identical reference numerals and the detailed descriptions thereof will be omitted.

The reel stand 100a is a modification of the reel stand 100 and acts as a torque limiter. The reel stand 100a can be referred to as a torque limiter acting as a reel stand.

The reel stand 100a includes an upper reel stand section 2a rotatable around a rotation shaft 1 as the center of rotation, and a lower reel stand section 3a rotatable around the rotation shaft 1 as the center of rotation. The upper reel stand section 2a includes a magnet 5, and the lower reel stand section 3a includes a hysteresis plate 6. The magnet 5 and the hysteresis plate 6 face each other with a gap therebetween.

FIG. 4 is a partial bottom view of the lower reel stand section 3a.

A magnetic tape 51 is wound around a reel 50 built in a cassette (not shown).

The upper reel stand section 2a on which the reel 50 is to be placed is rotatably outserted into the rotation shaft 1. A disc-shaped yoke plate 4 is formed of a ferromagnetic material such as, for example, rolled steel and is integrally formed with the upper reel stand section 2a. The upper reel stand section 2a and the yoke plate 4 may be outsert-molded. A magnet 5 is adsorbed to the yoke plate 4 by a magnetic force generated by the magnet 5, and is rotated with the yoke plate 4. A magnetic flux (not shown) generated by the magnet 5 forms a magnetic loop which passes through the yoke plate 4.

The lower reel stand section 3a is rotatably outserted into the rotatable shaft 1, like the upper reel stand section 2a. The lower reel stand section 3a is integrally formed with the disc-shaped hysteresis plate 6. The hysteresis plate 6 is formed of a material having a large magnetic hysteresis loss. The lower reel stand section 3a and the hysteresis plate 6 may be outsert-molded. A gear section 12 engageable with an external gear (not shown) is provided around an outer circumference of the lower reel stand section 3a. The lower reel stand section 3a is attracted toward the upper reel stand section 2a by the magnetic force generated by the magnet 5, and a contact portion 7a of the lower reel stand section 3a contacts a metal washer 8a included in the upper reel stand section 2a in a thrust direction. The metal washer 8a acts as a contact portion of the upper reel stand section 2a.

The contact portion 7a, the metal washer 8a and the rotation shaft 1 are coated with a lubricant 14 like in the reel stand 100. In this example, the contact portion 7a, the metal washer 8a and the rotation shaft 1 are coated with the same lubricant 14. The lubricant 14 is permeated into a contact area 13a at which the contact portion 7a and the metal washer 8a are in contact with each other.

The rotation shaft 1 and the contact portion 7a has a space 20a therebetween, not the wall 11 as shown in FIG. 5. Thus, an unobstructed path exists in a plane perpendicular to the rotation shaft 1 between the rotation shaft 1 and the contact area 13a as shown in FIG. 3. Owing to such a structure, the inner and outer diameters of the contact area 7a can be made smaller than those of the contact portion 57 shown in FIG. 5.

With reference to FIG. 4, the metal washer 8a is fixed to the upper reel stand section 2a via a stopper claw 9a formed in an outer circumference of the metal washer 8a. The metal washer 8a rotates together with the upper reel stand section 2a. The metal washer 8a is formed of a metal material such as, for example, stainless steel, cold-rolled steel, or nickel-plated cold-rolled steel. Owing to such a material, the metal washer 8a is improved in abrasion resistance and provides a stable friction coefficient With the contact portion 7a.

Hereinafter, an operation of the reel stand 100a will be described.

By the magnetic force generated by the magnet 5, a friction torque is generated between the washer 8a included in the upper reel stand section 2a and the contact portion 7a. When the external gear (not shown) drives and rotates the lower reel stand section 3a, the hysteresis plate 6 crosses the magnetic loop generated by the magnet 5, thus generating a magnetic hysteresis torque. The friction torque and the hysteresis torque act together as the clutch torque generated between the upper reel stand section 2a and the lower reel stand section 3a. The reel stand 100a, which is rotated by the external gear, rotates the reel 50 while supplying an appropriate tension to the magnetic tape 51 by the clutch torque.

In this example, the wall 11 as shown in FIG. 5 does not exist between the rotation shaft 1 and the contact area 13a of the contact portion 7a and the metal washer 8a. This allows the inner and outer diameters of the contact portion 7a to be reduced as compared to that of the contact portion 57 shown in FIG. 5. As a result, the friction torque generated between the contact portion 7a and the metal washer 8a can be lowered. This stabilizes the clutch torque.

In this example, the rotation shaft 1 and the contact area 13a do not have a wall therebetween, and the contact area 13a is in the same plane as a portion 16b of the upper reel stand section 2a which is inner to the contact area 13a. The contact area 13a is closer to the upper reel stand section 2a than an upper surface of a portion 16a of the lower reel stand section 3a which is inner to the contact area 13a. The contact area 13a is closer to the upper reel stand section 2a than an upper edge 15a of an inner circumferential surface of the lower reel stand section 3a. Accordingly, when the contact portion 7a becomes short of the lubricant 14, the lubricant 14 on the rotation shaft 1 is supplied to the contact portion 7a. Thus, the contact portion 7a is protected against becoming out of lubricant. Since the wall is not present, the lubricant 14 is supplied from the rotation shaft 1 to the contact portion 7a smoothly. Since the elimination of the wall allows the lubricant 14 to be accumulated in the space 20a, the contact portion 7a is protected against becoming out of lubricant. Foreign substances, such as abrasion particles, generated from the contact area 13a are discharged to the space 20a via the lubricant 14. Therefore, the contact portion 7a and the metal washer 8a are protected against abnormal abrasion. This stabilizes the clutch torque.

In the first and second examples, the upper reel stand section includes a magnet and a yoke plate, and the lower reel stand section includes a hysteresis plate. Alternatively, the upper reel stand section may include a hysteresis plate, and the upper reel stand section may include a magnet and a yoke plate.

In the first and second examples, a torque limiter is embodied as a reel stand engageable with the reel in the cassette for conveying the rotation of the reel stand itself to the reel. The present invention is not limited to a torque limiter having a function of a reel stand, but is also applicable to torque limiters used for other purposes.

A torque limiter according to the present invention includes a first rotatable body rotatable around a rotation shaft as a center of rotation; and a second rotatable body rotatable around the rotation shaft as a center of rotation. The first rotatable body includes one of a magnet and a hysteresis plate. The second rotatable body includes the other of the magnet and the hysteresis plate. The magnet and the hysteresis plate face each other. The first rotatable body and the second rotatable body are in contact with each other. No wall is provided between the rotation shaft and a contact area at which the first rotatable body and the second rotatable body are in contact with each other. Since there is no wall between the contact area and the rotation shaft, the inner and outer diameters of the contact portion can be reduced. This allows the friction torque to be reduced, which stabilizes the clutch torque. Since there is no wall between the contact area and the rotation shaft, a space is formed between the contact area and the rotation shaft. Foreign objects such as abrasion particles generated from the contact area are discharged from the contact area to the space, and thus abnormal abrasion of the contact portion can be avoided. This stabilizes the clutch torque.

The contact area may be closer to the first rotatable body than a portion of the second rotatable body, the portion being inner to the contact area. The contact area may be closer to the first rotatable body than an edge of an inner circumferential surface of the second rotatable body, the edge facing the first rotatable body. The contact area may be in an identical plane to a portion of the second rotatable body, the portion being inner to the contact area. The contact area may be in an identical plane to an edge of an inner circumferential surface of the second rotatable body, the edge facing the first rotatable body. Owing to these features, the above-described space is formed between the contact area and the rotation shaft.

The first rotatable body includes a first contact portion; and the second rotatable body includes a second contact portion which is contactable with the first contact portion at the contact area. Each of the first contact portion, the second contact portion, and the rotation shaft is coated with a lubricant. The above-described space is formed between the contact area and the rotation shaft. When the contact portion becomes short of lubricant, the lubricant on the rotation shaft is smoothly supplied to the contact portion, thus protecting the contact portion against becoming out of lubricant. The elimination of the wall realizes a smooth supply of a lubricant from the rotation shaft to the contact portion. Since the lubricant is accumulated in the space formed owing to the elimination of the wall, the contact portion is protected against becoming out of lubricant. Since foreign objects such as abrasion particles generated by the contact area are discharged to the space via the lubricant, abnormal abrasion of the contact portion can be avoided. This stabilizes the clutch torque.

The first contact portion, the second contact portion, and the rotation shaft are coated with an identical lubricant. Owing to this structure, even if the lubricant coating the first contact portion, the lubricant coating the second contact portion, and the lubricant coating the rotation shaft are mixed together, no harm is caused. The contact portions are protected against becoming out of lubricant, and thus the clutch torque is stabilized.

One of the first contact portion and the second contact portion is a metal washer. Since the abrasion resistance of the metal washer is high, a stable clutch torque is realized.

As described above, the present invention is especially useful for a torque limiter used in magnetic recording and reproduction apparatuses, specifically for a reel stand used as such a torque limiter.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A torque limiter, comprising:
   a first rotatable body rotatable around a rotation shaft as a center of rotation; and
   a second rotatable body rotatable around the rotation shaft as a center of rotation;
   wherein:
   the first rotatable body includes one of a magnet and a hysteresis plate;
   the second rotatable body includes the other of the magnet and the hysteresis plate;
   the magnet and the hysteresis plate face each other;
   the first rotatable body and the second rotatable body are in contact with each other; and
   an unobstructed path exists in a plane perpendicular to the rotation shaft between the rotation shaft and a contact area at which the first rotatable body and the second rotatable body are in contact with each other.

2. A torque limiter according to claim 1, wherein the contact area is closer to the first rotatable body than a portion of the second rotatable body, the portion being inner to the contact area.

3. A torque limiter according to claim 1, wherein the contact area is closer to the first rotatable body than an edge of an inner circumferential surface of the second rotatable body, the edge facing the first rotatable body.

4. A torque limiter according to claim 1, wherein the contact area is in an identical plane to a portion of the second rotatable body, the portion being inner to the contact area.

5. A torque limiter according to claim 1, wherein the contact area is in an identical plane to an edge of an inner circumferential surface of the second rotatable body, the edge facing the first rotatable body.

6. A torque limiter according to claim 1, wherein:
the first rotatable body includes a first contact portion; and
the second rotatable body includes a second contact portion which is contactable with the first contact portion at the contact area.

7. A torque limiter according to claim 6, wherein each of the first contact portion, the second contact portion, and the rotation shaft is coated with a lubricant.

8. A torque limiter according to claim 6, wherein the first contact portion, the second contact portion, and the rotation shaft are coated with an identical lubricant.

9. A torque limiter according to claim 6, wherein one of the first contact portion and the second contact portion is a metal washer.

10. A torque limiter according to claim 1, further comprising a yoke in contact with the magnet.

11. A torque limiter according to claim 1, wherein the torque limiter is a reel stand.

* * * * *